Patented Dec. 30, 1930

1,786,873

UNITED STATES PATENT OFFICE

EMIL STARKENSTEIN, OF PRAGUE, CZECHOSLOVAKIA, ASSIGNOR TO THE FIRM CHEMISCHE FABRIK AUF ACTIEN (VORM. E. SCHERING), OF BERLIN, GERMANY

PHARMACEUTICAL PRODUCT AND PROCESS OF MAKING SAME

No Drawing. Application filed February 16, 1927, Serial No. 168,831, and in Germany February 26, 1926.

My invention refers to a new pharmaceutical product which is particularly effective in combating vagotony. The investigations made by Eppinger and Hess have shown that the complex of symptoms which arises for instance in cases of sea-sickness is principally due to an excitation of the nervus vagus. It has therefore been repeatedly tried to influence the symptoms of nausea by means of alkaloids capable of paralyzing the nervus vagus. Thus, for instance, Fischer and Pribram have suggested to combat sea-sickness by injecting atropine. However the great toxic action of atropine does not admit of a sufficiently large dosis, more especially when dispensed per os or per rectum, inasmuch as the danger of unwelcome phenomena arises.

I have now ascertained that by combining an alkaloid (such for instance as atropine or hyoscyamine) which has the property of at the same time paralyzing the nervus vagus and exciting the central nerve system, with another alkaloid (such for instance as scopolamine) which, while also paralyzing the nervus vagus has the property of paralyzing also the central nerve system, a remedy can be obtained which allows combating the symtoms of sea-sickness with certainty, causing no undue accompanying symptoms. Racemic atropine as well as 1-and d-hyoscyamine are esters of tropic acid ($\alpha$-phenyl-$\beta$-hydroxypropionic acid, which has an asymmetric carbon atom$^x$

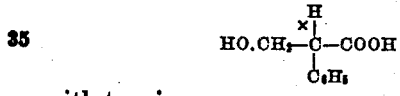

with tropine

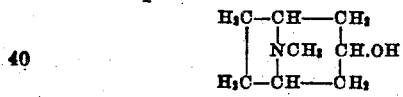

I have found that the vagus-paralyzing effect of atropine or hyoscyamine is greatly increased by the same property of scopolamine, while the exciting effect exerted by atropine and hyoscyamine on the central nerve system is balanced or at least greatly weakened by the paralyzing properties exerted by scopolamine.

I have for instance found that a combination of 10-20 parts by weight of atropine or hyoscyamine with 1 part scopolamine is particularly effective. The alkaloids are preferably combined in the form of the inorganic or organic salts or double salts, suitable diluting agents and agglutinants being added if desired to form the mixture into tablets.

In the practice of my invention I have found it preferable to combine scopolamine with hyoscyamine alone or together with atropine.

The favorable effect of the combination in both directions, not only as regards the vagus-paralyzing effect but also the paralyzing action on the central nerve system, can be still further increased if the inactive alkaloids are replaced by their left-configurated forms such as l-hyoscyamine and l-scopolamine. A particularly effective remedy is formed by the combination of camphoric l-hyoscyamine and camphoric l-scopolamine, for camphoric acid and its derivatives, such as bromo-camphoric acid will enhance the vagus-paralyzing effect of the alkaloids.

By thus combining two alkaloids the disagreeable phenomena arising from the use of the alkaloids are greatly reduced and it is thus possible to deliver sufficiently large doses thereof for a reliable combating of vagotony and to dispose of its symptoms also by dispensing the combined product per os or per rectum.

The new product is not only adapted for use with nausea of all kinds, sea-sickness, railway-sickness and so on, but also in cases of vomiting of pregnance nervous headaches (migraine) accompanied by vomiting, etc.

*Example 1.*—23.4 grams atropine sulfuricum are mixed with 1.45 grams scopolamine bromine hydrate. The mixture is diluted with 4000 grams bromo camphor and 5000 grams of suitable diluting agents and agglutinants are added. From this mass can be formed 10,000 tablets, weighing 0.5 grams and containing 2 milligrams atropine and 0.1 milligram scopolamine.

*Example 2.*—16.9 grams camphoric l-hyoscyamine, 1.66 camphoric scopolamine and 4000 grams camphoric acid are mixed with suitable diluting agents and agglutinants to form a mass of 5000 grams.

*Example 3.*—15.2 grams camphoric l-hyoscyamine and 2.62 grams camphoric l-hyoscyamine-scopolamine are mixed with 4000 grains bromo camphoric acid, to the mixture being added agglutinants to furnish a total mass weighing 5000 grams, from which can be form 10,000 tablets of 0.5 grams each, containing 1 milligram l-hyoscyamine and 0.1 milligram l-scopolamine.

*Example 4.*—23.65 grams camphoric hyoscyamine, 2.45 grams hyoscyamine-scopolamine tartrate and 4000 grams camphoric acid are mixed with suitable diluents and agglutinants to form 5000 grams.

*Example 5.*—1.69 grams camphoric l-hyoscyamine and 0.166 grams camphoric l-scopolamine are dissolved in 1000 grams water. 20 drops of the solution are equal to 1 milligram hyoscyamine and 0.1 milligram scopolamine.

Various changes may be made in the details disclosed in the foregoing specification without departing from the invention or sacrificing the advantages thereof.

I claim:—

1. As a new composition of matter for use as a pharmaceutical product, a mixture of hyoscyamine and scopolamine.

2. As a new composition of matter for use as a pharmaceutical product, a mixture of l-hyoscyamine and scopolamine.

3. As a new composition of matter for use as a pharmaceutical product, a mixture of l-hyoscyamine and l-scopolamine.

4. As a new composition of matter for use as a pharmaceutical product, a mixture of 10 parts hyoscyamine and 1 part scopolamine.

5. As a new composition of matter for use as a pharmaceutical product, a tablet containing 1 milligram camphoric l-hyoscyamine and 0.1 milligram camphoric l-scopolamine.

6. As a new composition of matter for use as a pharmaceutical product, a mixture of a tropic acid ester of tropine with scopolamine.

7. As a new composition of matter for use as a pharmaceutical product, a mixture of a salt of a tropic acid ester of tropine with a salt of scopolamine.

8. As a new composition of matter for use as a pharmaceutical product a mixture of a camphoric salt of a tropic acid ester of tropine with a camphoric salt of scopolamine.

9. As a new composition of matter for use as a pharmaceutical product a mixture of about 10 parts of the camphoric l-hyoscyamine and one part of the camphoric salt of l-scopolamine.

10. As a new composition of matter for use as a pharmaceutical product a mixture of about 10 parts of the camphoric salt of l-hyoscyamine, one part of the camphoric salt of l-scopolamine, a diluent and a binding material.

11. As a new composition of matter for use as a pharmaceutical product, a mixture of the camphoric salt of l-hyoscyamine and the camphoric salt of l-scopolamine.

In testimony whereof I affix my signature.

EMIL STARKENSTEIN.